(12) United States Patent
House (10) Patent No.: US 8,814,033 B2
(45) Date of Patent: Aug. 26, 2014

(54) TRIANGULAR VENTED TRAY

(75) Inventor: Richard F. House, Albuquerque, NM (US)

(73) Assignee: Graphic Packaging International, Inc., Atlanta, GA (US)

(*) Notice: Subject to any disclaimer, the term of this patent is extended or adjusted under 35 U.S.C. 154(b) by 665 days.

(21) Appl. No.: 12/947,114

(22) Filed: Nov. 16, 2010

(65) Prior Publication Data

US 2011/0114715 A1    May 19, 2011

Related U.S. Application Data

(60) Provisional application No. 61/281,330, filed on Nov. 16, 2009.

(51) Int. Cl.
| | | |
|---|---|---|
| B65D 5/42 | (2006.01) | |
| B65D 5/00 | (2006.01) | |
| B31B 49/02 | (2006.01) | |
| B65D 5/68 | (2006.01) | |
| B65D 81/34 | (2006.01) | |
| B65D 5/20 | (2006.01) | |

(52) U.S. Cl.
CPC .......... *B65D 5/2028* (2013.01); *B65D 2205/02* (2013.01); *B65D 5/4295* (2013.01); *B65D 5/68* (2013.01); *B65D 2581/3406* (2013.01); *B65D 81/3453* (2013.01)
USPC ............ 229/115; 229/120; 229/100; 493/162

(58) Field of Classification Search
USPC ........ 229/100, 120.1, 125.125; 206/436, 551, 206/822; 217/42, 74; 119/493; 219/734
See application file for complete search history.

(56) References Cited

U.S. PATENT DOCUMENTS

| | | |
|---|---|---|
| 662,969 A | 12/1900 | Roth |
| 978,569 A | 12/1910 | Elkin |

(Continued)

FOREIGN PATENT DOCUMENTS

| | | |
|---|---|---|
| DE | 75 23 198 | 11/1975 |
| DE | 296 13 331 U1 | 10/1996 |

(Continued)

OTHER PUBLICATIONS

International Search Report and Written Opinion dated Aug. 26, 2011 for PCT/US2010/056812.

(Continued)

*Primary Examiner* — Gary Elkins
*Assistant Examiner* — Christopher Demeree
(74) *Attorney, Agent, or Firm* — Womble Carlyle Sandridge & Rice, LLP (57) ABSTRACT

A package for holding a food product. The package comprises a tray comprising a plurality of tray panels that extend at least partially around an interior of the tray. The plurality of tray panels comprise a tray central panel and at least one tray side panel foldably connected to the tray central panel. The package also comprises a lid comprising a plurality of lid panels that extend at least partially around an interior of the lid. The plurality of lid panels comprise a lid central panel and at least one lid side panel foldably connected to the lid central panel. The lid cooperates with the tray to at least partially close the package when the package is configured in a closed position and a venting position. Venting features are operable to vent the package when the package is configured in the venting position.

16 Claims, 8 Drawing Sheets

(56) References Cited

U.S. PATENT DOCUMENTS

| | | | |
|---|---|---|---|
| 1,651,848 A | 12/1927 | Stevens | |
| 1,667,376 A | 4/1928 | Fehrenkamp | |
| 1,814,561 A | 7/1931 | Krumm | |
| 1,824,862 A | 9/1931 | Young | |
| 2,100,888 A | 11/1937 | Vine | |
| 2,107,946 A | 2/1938 | Inman | |
| 2,312,595 A | 3/1943 | Smith | |
| 2,345,000 A * | 3/1944 | Newsom | 229/120 |
| 2,363,861 A | 11/1944 | Goodyear | |
| 2,565,146 A | 8/1951 | Okon | |
| 2,583,915 A | 1/1952 | Whitley | |
| 2,804,252 A * | 8/1957 | Nute | 229/120.1 |
| 2,844,294 A * | 7/1958 | Williams | 229/120.1 |
| 2,955,733 A * | 10/1960 | Wilson | 229/120.1 |
| 2,967,610 A | 1/1961 | Ebert | |
| 3,107,039 A | 10/1963 | Painter | |
| 3,142,430 A | 7/1964 | Meyers | |
| 3,515,331 A | 6/1970 | Guthrie | |
| 3,876,131 A * | 4/1975 | Tolaas | 229/104 |
| 3,907,195 A | 9/1975 | Struble | |
| 4,008,849 A | 2/1977 | Baber | |
| 4,039,120 A | 8/1977 | Herzog | |
| 4,313,542 A | 2/1982 | Roberts et al. | |
| 4,477,014 A | 10/1984 | Brandenburger | |
| 4,492,333 A | 1/1985 | Roberts | |
| 4,592,914 A | 6/1986 | Kuchenbecker | |
| 4,775,771 A | 10/1988 | Pawlowski et al. | |
| 4,798,323 A | 1/1989 | Platt | |
| 4,815,609 A | 3/1989 | Kiedaisch | |
| 4,865,921 A | 9/1989 | Hollenberg et al. | |
| 4,890,439 A | 1/1990 | Smart | |
| 4,936,935 A | 6/1990 | Beckett | |
| 4,963,424 A | 10/1990 | Beckett | |
| 4,993,625 A | 2/1991 | Stease et al. | |
| 5,039,364 A | 8/1991 | Beckett et al. | |
| 5,047,710 A | 9/1991 | Mahoney | |
| 5,117,078 A | 5/1992 | Beckett | |
| 5,118,033 A | 6/1992 | Kula | |
| 5,213,902 A | 5/1993 | Beckett | |
| 5,221,419 A | 6/1993 | Beckett | |
| 5,260,537 A | 11/1993 | Beckett | |
| 5,266,386 A | 11/1993 | Beckett | |
| 5,266,763 A * | 11/1993 | Colombo | 219/734 |
| 5,300,748 A * | 4/1994 | Colombo | 219/734 |
| RE34,683 E | 8/1994 | Maynard et al. | |
| 5,338,921 A | 8/1994 | Maheux et al. | |
| 5,340,436 A | 8/1994 | Beckett | |
| 5,354,973 A | 10/1994 | Beckett | |
| 5,402,931 A | 4/1995 | Gulliver et al. | |
| 5,410,135 A | 4/1995 | Pollart et al. | |
| 5,424,517 A | 6/1995 | Habeger, Jr. et al. | |
| 5,519,195 A | 5/1996 | Keefer et al. | |
| 5,582,345 A | 12/1996 | Lankhuijzen | |
| 5,628,921 A | 5/1997 | Beckett | |
| 5,672,407 A | 9/1997 | Beckett | |
| 5,704,483 A | 1/1998 | Groh | |
| 5,707,004 A | 1/1998 | Cai | |
| 5,726,426 A | 3/1998 | Davis et al. | |
| 5,759,422 A | 6/1998 | Schmelzer et al. | |
| 5,800,724 A | 9/1998 | Habeger et al. | |
| 6,102,568 A | 8/2000 | Davis | |
| 6,114,679 A | 9/2000 | Lai et al. | |
| 6,150,646 A | 11/2000 | Lai et al. | |
| 6,204,492 B1 | 3/2001 | Zeng et al. | |
| 6,251,451 B1 | 6/2001 | Zeng | |
| 6,414,290 B1 | 7/2002 | Cole et al. | |
| 6,433,322 B2 | 8/2002 | Zeng et al. | |
| 6,440,050 B1 | 8/2002 | Capparelli | |
| 6,455,827 B2 | 9/2002 | Zeng | |
| 6,552,315 B2 | 4/2003 | Zeng et al. | |
| 6,677,563 B2 | 1/2004 | Lai | |
| 6,695,202 B2 | 2/2004 | Miess | |
| 6,717,121 B2 | 4/2004 | Zeng et al. | |
| 6,765,182 B2 | 7/2004 | Cole et al. | |
| 6,866,189 B2 | 3/2005 | Nelson | |
| 6,966,483 B2 | 11/2005 | Manninen | |
| 7,019,271 B2 | 3/2006 | Wnek et al. | |
| D532,690 S | 11/2006 | Oliveira | |
| 7,159,760 B2 | 1/2007 | Pluck et al. | |
| 7,323,699 B2 | 1/2008 | Hopkins et al. | |
| 7,365,292 B2 | 4/2008 | Cole et al. | |
| 7,473,875 B2 | 1/2009 | Fitzwater | |
| 7,514,659 B2 | 4/2009 | Lafferty | |
| 7,617,969 B2 | 11/2009 | Oliveira | |
| 7,621,439 B2 | 11/2009 | McClure | |
| 7,652,233 B2 | 1/2010 | Keefe | |
| 7,667,167 B2 | 2/2010 | Fitzwater | |
| 7,938,267 B2 * | 5/2011 | Cross | 206/540 |
| 2003/0106926 A1 | 6/2003 | Beatificato et al. | |
| 2004/0089656 A1 | 5/2004 | Watkins | |
| 2004/0159698 A1 | 8/2004 | Tallevi et al. | |
| 2006/0049190 A1 | 3/2006 | Middleton et al. | |
| 2006/0113300 A1 | 6/2006 | Wnek et al. | |
| 2006/0278521 A1 | 12/2006 | Stowell | |
| 2007/0251942 A1 | 11/2007 | Cole et al. | |
| 2007/0251943 A1 | 11/2007 | Wnek et al. | |
| 2007/0275130 A1 | 11/2007 | Cole et al. | |
| 2008/0000897 A1 | 1/2008 | Robbins et al. | |
| 2008/0047958 A1 | 2/2008 | Cole et al. | |
| 2008/0078759 A1 | 4/2008 | Wnek et al. | |
| 2008/0081095 A1 | 4/2008 | Cole et al. | |
| 2008/0179385 A1 | 7/2008 | Nikolai et al. | |
| 2008/0290149 A1 | 11/2008 | Sweet | |
| 2009/0090708 A1 | 4/2009 | Requena et al. | |
| 2009/0200364 A1 | 8/2009 | Oliveira | |
| 2010/0051675 A1 | 3/2010 | Sweet | |
| 2010/0055260 A1 | 3/2010 | Sweet | |
| 2010/0243510 A1 * | 9/2010 | Cross | 206/540 |

FOREIGN PATENT DOCUMENTS

| | | |
|---|---|---|
| EP | 0270838 A1 | 6/1988 |
| EP | 1481922 A2 | 12/2004 |
| FR | 2867346 A1 | 9/2005 |
| JP | 4-253670 A | 9/1992 |
| JP | 03095906 A | 6/2003 |
| JP | 03106317 A | 10/2004 |
| JP | 2007-168832 A | 7/2007 |
| KR | 20-0253232 | 11/2001 |
| WO | WO-91/05448 A1 | 4/1991 |
| WO | WO-94/05563 A1 | 3/1994 |
| WO | WO-02/40374 A1 | 5/2002 |
| WO | WO-03066435 A2 | 8/2003 |
| WO | WO-2005077783 A1 | 8/2005 |
| WO | WO-2005085091 A2 | 9/2005 |
| WO | WO-2006076501 A1 | 7/2006 |
| WO | WO-2007127235 A2 | 11/2007 |
| WO | WO-2007133659 A2 | 11/2007 |
| WO | WO-2007136839 A2 | 11/2007 |
| WO | WO-2008137525 A2 | 11/2008 |
| WO | WO-2008137528 A2 | 11/2008 |

OTHER PUBLICATIONS

Supplementary European Search Report dated Apr. 6, 2011 for EP 08 74 7324.
Supplementary European Search Report dated May 16, 2011 for EP 08747321.1.

* cited by examiner

TRIANGULAR VENTED TRAY

CROSS-REFERENCE TO RELATED APPLICATIONS

This application claims the benefit of U.S. Provisional Patent Application No. 61/281,330, filed Nov. 16, 2009.

INCORPORATION BY REFERENCE

U.S. Provisional Patent Application No. 61/281,330, which was filed on Nov. 16, 2009, is hereby incorporated by reference for all purposes as if presented herein in its entirety.

BACKGROUND OF THE DISCLOSURE

The present disclosure generally relates to packages for holding and heating food products and to packages that allow for expansion of the food as it cooks, or holds steam, or vents steam.

SUMMARY OF THE DISCLOSURE

In one aspect, the disclosure is generally directed to a package for holding a food product. The package comprises a tray comprising a plurality of tray panels that extend at least partially around an interior of the tray. The plurality of tray panels comprise a tray central panel and at least one tray side panel foldably connected to the tray central panel. The package also comprises a lid comprising a plurality of lid panels that extend at least partially around an interior of the lid. The plurality of lid panels comprise a lid central panel and at least one lid side panel foldably connected to the lid central panel. The lid cooperates with the tray to at least partially close the package when the package is configured in a closed position and a venting position. Venting features are operable to vent the package when the package is configured in the venting position.

In general, another aspect of the disclosure is directed to the combination of a tray blank, a lid blank, and an insert blank for forming a package for holding a food product. The tray blank comprises a plurality of tray panels comprising a tray central panel and at least one tray side panel foldably connected to the tray central panel. The lid blank comprises a plurality of lid panels comprising a lid central panel and at least one lid side panel foldably connected to the lid central panel. The lid cooperates with the tray to at least partially close a package formed from the tray blank, the lid blank, and the insert blank when the package is configured in a closed position and a venting position. The insert blank comprises venting features operable to vent the package when the package is configured in the venting position.

In general, another aspect of the disclosure is directed to a method of forming a package for holding a food product. The method comprises obtaining a tray blank comprising a plurality of tray panels comprising a tray central panel and at least one tray side panel foldably connected to the tray central panel, and forming an interior of a tray by folding the at least one tray side panel relative to the tray central panel. The method further comprises obtaining a lid blank comprising a plurality of lid panels comprising a lid central panel and at least one lid side panel foldably connected to the lid central panel, and forming an interior of a lid by folding the at least one lid side panel relative to the lid central panel. The method further comprises obtaining an insert comprising venting features, positioning at least a portion of the insert in the interior of the lid or the tray, and positioning the lid relative to the tray to at least partially close the package. The lid is movable with respect to the tray for configuring the package in a closed position and a venting position.

Those skilled in the art will appreciate the above stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the disclosure.

BRIEF DESCRIPTION OF THE DRAWINGS

Corresponding parts are designated by corresponding reference numbers throughout the drawings.

DETAILED DESCRIPTION OF THE EXEMPLARY EMBODIMENTS

The package of the present disclosure can be useful in containing a food product such as any suitable type of food product that can be heated or cooked in a microwave oven. For example, the food product could include frozen food products or nonfrozen food products. Some suitable food products could comprises a frozen pizza, a frozen sandwich, frozen vegetables, popcorn, or any other suitable food product. Further, the package of the present disclosure can be used for heating, cooking, browning, crisping, etc. the food product by use of a heating or cooking device such as a microwave oven. It is understood that food products other than the food products listed herein may be contained in the package. Further, food products contained in this package may be generally triangular, round, square, rectangular, irregular, or any other shape. In this specification, the terms "lower," "bottom," "upper" and "top" indicate orientations determined in relation to fully erected and upright packages.

Figure 1:
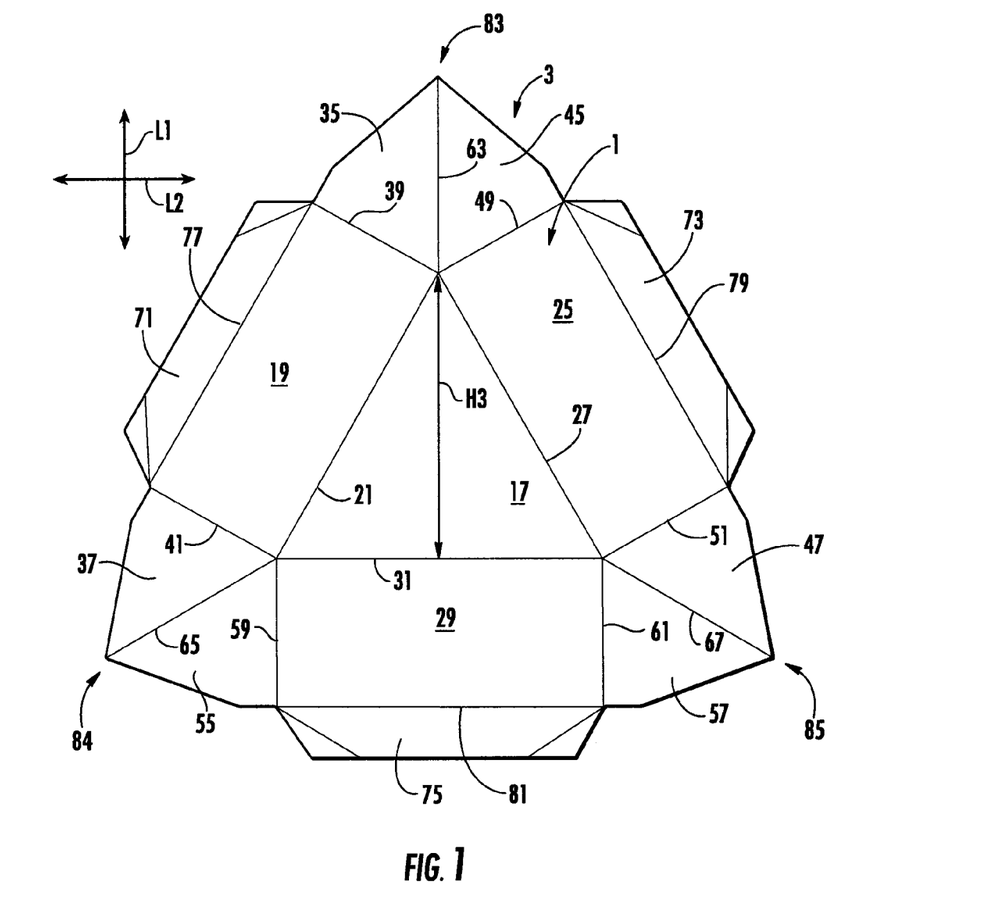
FIG. 1 is a plan view of a tray blank used to form an exemplary tray according to one embodiment of the disclosure.
Figure 3:
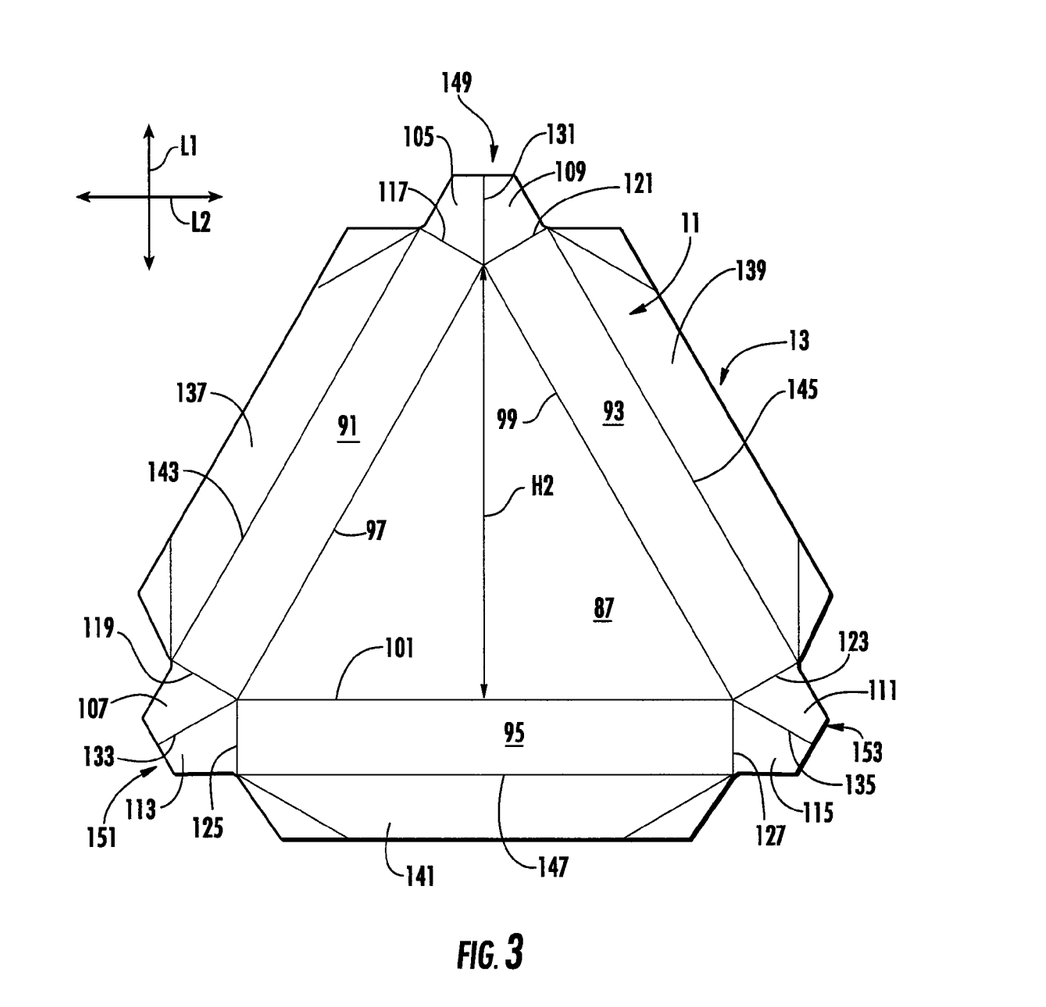
FIG. 3 is a plan view of a lid blank used to form a lid according to one embodiment of the disclosure.
Figure 4:
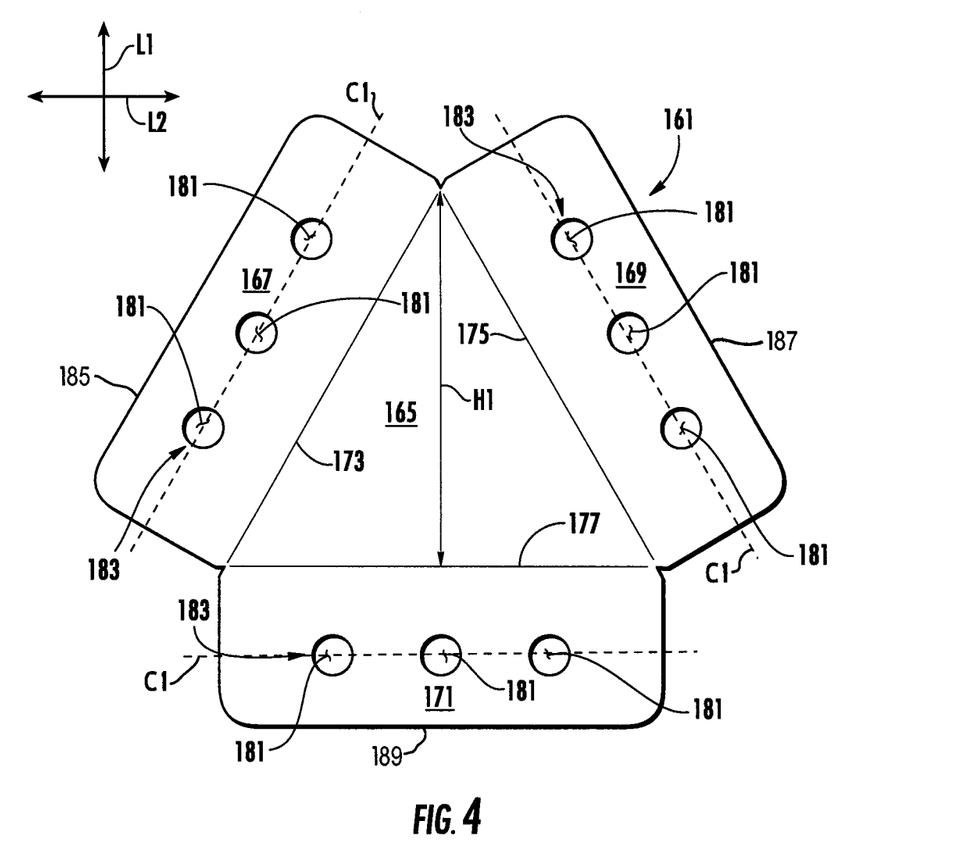
FIG. 4 is a plan view of an insert blank for forming an insert according to one embodiment of the disclosure.
Figure 5:
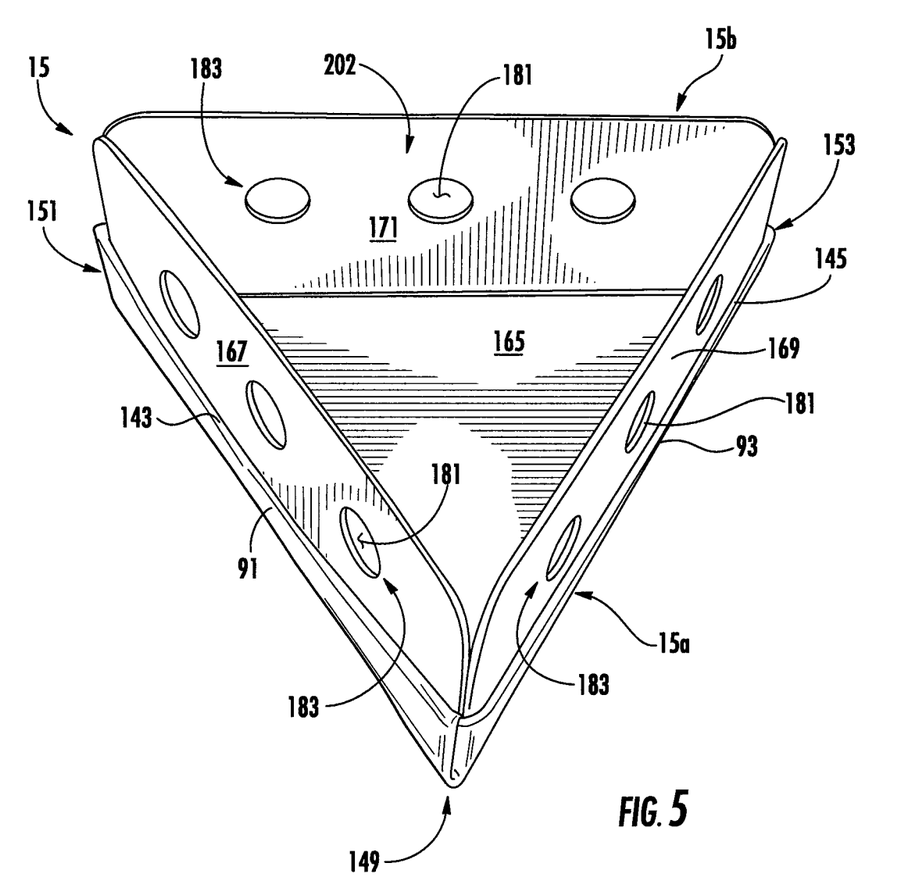
FIG. 5 is a perspective view of a lid assembly with a lid and an insert according to one embodiment of the disclosure.

FIG. 1 is a plan view of an exterior side 1 of a tray blank, generally indicated at 3, used to form a tray 5, with an interior 200, (FIG. 2) of a package 7 (FIGS. 6 and 7) according to a first exemplary embodiment of the disclosure. FIG. 3 is a plan view of an exterior side 11 of a lid blank, generally indicated at 13, used to form a lid 15a (FIG. 5A) of a lid assembly 15 (FIG. 5) of the package 7. FIG. 4 is a plan view of an insert blank, generally indicated at 161, used to form an insert 15b of the lid assembly 15. The lid assembly 15 defines an interior space 202 (FIG. 5). The package 7 can be used to hold a food product (not shown). In the illustrated embodiment, the package 7 is generally triangular-shaped and can be suitable for holding a food product similarly shaped (e.g., a single serving or triangular slice of pizza), but the package could be otherwise shaped with the same or a different number of side panels to hold correspondingly shaped food products. Further, the package 7 and blanks 3, 13, 161 may be alternatively sized, shaped and/or otherwise arranged to hold any number of food products including a single food product or more than two food products. In one embodiment, the package 7 is useful for holding the food product during storage in a freezer, during heating and/or cooking in a microwave oven (not shown), and/or during serving or consumption of the heated and/or cooked food product.

As shown in FIG. 1, the tray blank 3 has a longitudinal axis L1 and a lateral axis L2. In the illustrated embodiment, the tray blank 3 comprises a tray central panel 17 foldably connected to a first tray side panel 19 at an oblique first fold line 21. A second tray side panel 25 is foldably connected to the tray central panel 17 at an oblique second fold line 27. A third tray side panel 29 is foldably connected to the tray central panel 17 at a lateral third fold line 31. The blank 3 includes first tray corner panels 35, 37 respectively foldably connected to the first tray side panel 19 at fold lines 39, 41 located at respective ends of the first tray side panel. Second tray corner panels 45, 47 are respectively foldably connected to the second tray side panel 25 at fold lines 49, 51 located at respective ends of the second tray side panel. Third tray corner panels 55, 57 are respectively foldably connected to the third tray side panel 29 at fold lines 59, 61 located at respective ends of the third tray side panel. In the illustrated embodiment, adjacent tray corner panels 35, 45 are foldably connected at a fold line 63, adjacent tray corner panels 37, 55 are foldably connected at a fold line 65, and adjacent tray corner panels 47, 57 are foldably connected at a fold line 67. As shown in FIG. 1, each of the tray side panels 19, 25, 29 can include a respective tray reinforcement flap 71, 73, 75 respectively foldably connected to one of the tray side panels at a tray respective fold line 77, 79, 81. The tray blank 3 could be otherwise shaped, arranged, and/or configured without departing from the disclosure.

As shown in FIG. 3, the lid blank 13 is shaped generally similar to the tray blank 3. The lid blank 13 comprises a lid central panel 87 foldably connected to a first lid side panel 91 at an oblique first fold line 97. A second lid side panel 93 is foldably connected to the lid central panel 87 at an oblique second fold line 99, and a third lid side panel 95 is foldably connected to the lid central panel 87 at a lateral third fold line 101. The blank 13 includes first lid corner panels 105, 107 respectively foldably connected to the first lid side panel 91 at fold lines 117, 119 located at respective ends of the first lid side panel. Second tray corner panels 109, 111 are respectively foldably connected to the second lid side panel 93 at fold lines 121, 123 located at respective ends of the second lid side panel, and third lid corner panels 113, 115 are respectively foldably connected to the third lid side panel 95 at fold lines 125, 127 located at respective ends of the third lid side panel. In the illustrated embodiment, adjacent lid corner panels 105, 109 are foldably connected at a fold line 131, adjacent lid corner panels 107, 113 are foldably connected at a fold line 133, and adjacent lid corner panels 111, 115 are foldably connected at a fold line 135. Each side panel 91, 93, 95 can include a respective reinforcement flap 137, 139, 141 respective foldably connected to one of the side panels at a respective fold line 143, 145, 147. The lid blank 13 could be otherwise shaped, arranged, and/or configured without departing from the disclosure.

As shown in FIG. 4, an insert blank 161 can include an insert central panel 165 foldably connected to a first insert side panel 167 at an oblique first fold line 173. A second insert side panel 169 is foldably connected to the insert central panel 165 at an oblique second fold line 175, and a third insert side panel 171 is foldably attached to the central panel at a lateral third fold line 177. The central panel 165 is generally triangular and is sized to have a height H1 that is less than the height H2 of the central panel 87 of the lid blank 13. In the illustrated embodiment, each of the side panels 167, 169, 171 has openings 181 forming venting portions 183 located in a central portion of each insert side panel. In one embodiment, the openings 181 are generally circular apertures and each of the side panels 167, 169, 171 has three openings generally located on a central axis C1 that is spaced apart from a respective fold line 173, 175, 177 and a respective edge 185, 187, 189 of the side panels. The insert blank 161 could be otherwise shaped, arranged, and/or configured without departing from the disclosure. For example, each of the side panels can include any number of openings or other venting features arranged in any number of rows and columns. For example, the edges 185, 187, 189 of the side panels 167, 169, 171 could have notches or apertures for venting without departing from the disclosure.

Generally, according to one embodiment, the package 7 can be formed by forming the tray 5 from the tray blank 3, forming the lid assembly 15 from the lid blank 13 and insert blank 161, placing a food product in the tray, and placing the lid assembly on the tray to close the package.

Figure 2:
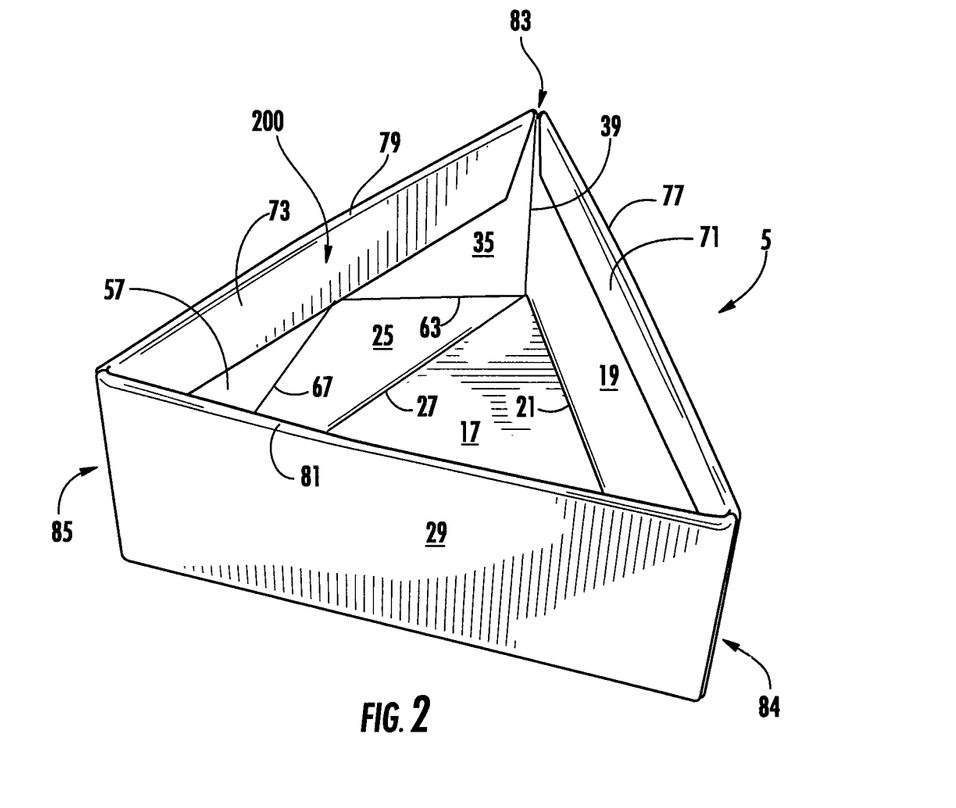
FIG. 2 is a perspective view of a tray according to one embodiment of the disclosure.

As shown in FIG. 2, the tray blank 3 is formed into the tray 5 by folding the tray side panels 19, 25, 29 relative to the tray central panel 17 along respective fold lines 21, 27, 31. When the tray side panels 19, 25, 29 are upwardly folded relative to the tray central panel 17, each adjacent pair of tray corner panels 35, 45; 37, 55; and 47, 57 are inwardly folded, overlapped, and placed in face-to-face contact to form respective closed tray corners 83, 84, 85. As shown in FIG. 2, the overlapped tray corner panels 35, 45 and the overlapped tray corner panels 47, 57 are positioned so that the inner tray corner panel 45, 47 of each pair is in face-to-face contact with the tray side panel 25. The other of the pair of tray corner panels 37, 55 is positioned so that the inner tray corner panel 55 is in face-to-face contact with the side panel 29. The overlapped tray corner panels 35, 45; 37, 55; and 47, 57 can be adhered to each other, to one or more of the tray side panels 19, 25, 29, or combinations thereof. Further, one or more of the overlapped tray corner panels 35, 45; 37, 55; and 47, 57 can be otherwise shaped, positioned, configured, arranged, and/or omitted without departing from the disclosure. For example, the overlapped tray corner panels 35, 45 can be positioned so that the tray corner panel 35 is in face-to-face contact with the first tray side panel 19.

After positioning the tray corner panels 35, 45; 37, 55; and 47, 57, the tray reinforcement flaps 71, 73, 75 are downwardly folded relative to a respective tray side panel 19, 25, 29 along a respective fold line 77, 79, 81. As shown in FIG. 2, the tray reinforcement flap 73 is downwardly folded to at least partially overlap the tray side panel 25 and the pairs of tray corner panels 35, 45 and 47, 57 that are positioned adjacent the tray side panel 25, the tray reinforcement flap 75 is downwardly folded to overlap the tray side panel 29 and the pair of overlapped tray corner panels 37, 55 that is positioned adjacent the tray side panel 29, and the tray reinforcement flap 71 is downwardly folded to be in face-to-face contact with the tray side panel 19. The tray reinforcement flaps 71, 73, 75 can be adhered to the inner surface of the respective tray side panel 19, 25, 29 and the pairs of tray corner panels 35, 45; 47, 57; or 37, 55 disposed between the tray reinforcement flap and the respective tray side panel, or combinations thereof. The tray 5 can be formed by other flap or panel positioning steps, and the tray 5 could be otherwise shaped, arranged, and/or configured without departing from the disclosure.

Figure 5A:
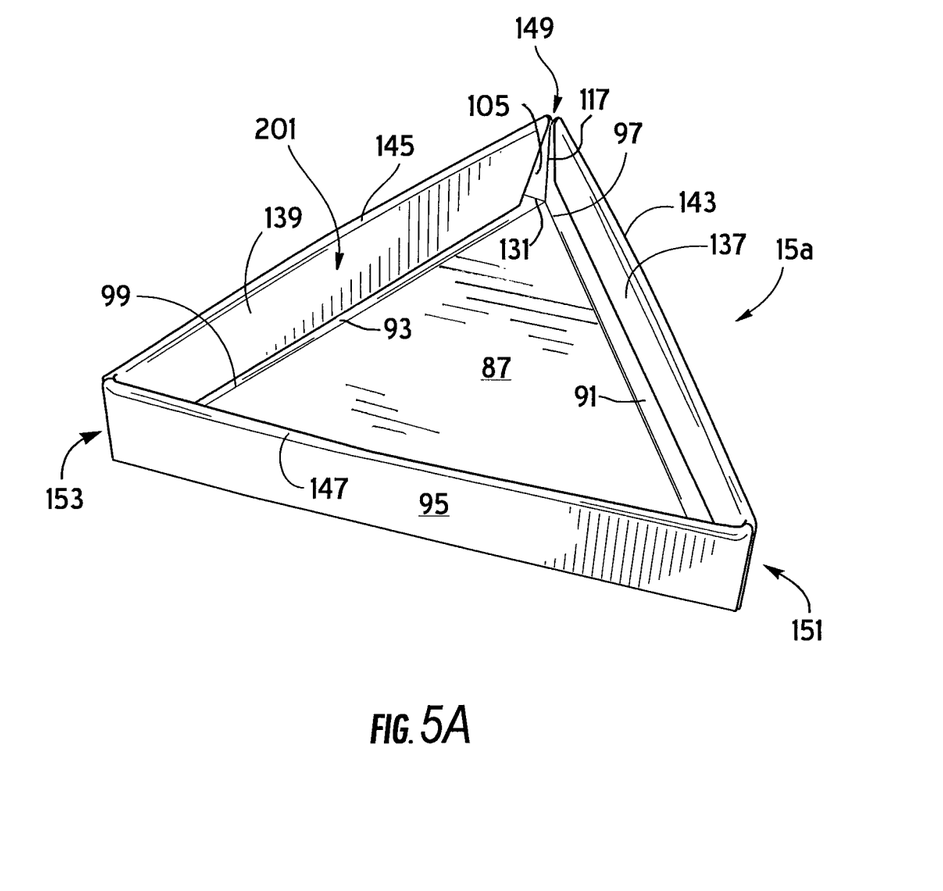
FIG. 5A is a perspective view of a lid of the lid assembly of FIG. 5.

As shown in FIG. 5, the lid assembly 15 is formed by first positioning the lid blank 13 in a similar manner as the tray blank 3 to form a top portion or lid 15a of the lid assembly (FIG. 5A). When the lid 15a is inverted, as shown in FIGS. 5 and 5A, it is in the form of a tray that is generally similar in shape as the tray 5 described above. The lid side panels 91, 93, 95 can be folded along respective fold lines 97, 99, 101 to be generally perpendicular to the lid central panel 87. Each adjacent pair of lid corner panels 105, 131; 107, 113; and 111, 115 are also inwardly folded, overlapped, and placed in face-to-face contact to form respective closed lid corners 149, 151, 153. The overlapped lid corner panels 105, 131; 107, 113; and 111, 115 can be positioned in face-to-face contact with either lid side panel of the respective pairs of lid side panels 91, 93; 91, 95; or 93, 95 respectively adjacent to the lid corners 149, 151, 153. For example, the lid corner panel 105 can be adhered to the first lid side panel 91, the lid corner panel 113 can be adhered to the third lid side panel 95, and the lid corner panel 111, can be adhered to the lid side panel 93.

After positioning the lid corner panels 105, 131; 107, 113; and 111, 115, the lid reinforcement flaps 137, 139, 141 are downwardly folded relative to a respective lid side panel 91, 93, 95 along a respective fold line 143, 145, 147 to overlap the respective lid side panel 91, 93, 95 and the lid corner panels 105, 131, 107, 113, 111, 115 disposed therebetween. The lid reinforcement flaps 137, 139, 141 can be adhered to the inner surface of the respective lid side panel 91, 93, 95, the pairs of lid corner panels 105, 131; 107, 113; or 111, 115 disposed between the lid reinforcement flap and the respective lid side panel, or combinations thereof. The lid 15a can be formed by other flap or panel positioning steps, and the lid 15a could be otherwise shaped, arranged, and/or configured without departing from the disclosure.

The insert 15b or bottom portion of the lid assembly 15 can be formed by upwardly folding the insert side panels 167, 169, 171 relative to the insert central panel 165. The insert 15b is sized to fit inside the inverted lid 15a of the lid assembly 15. As shown in FIG. 5, the insert 15b is inserted into the interior space 201 (FIG. 5A) of the lid 15a, and the insert central panel 165 positioned in face-to-face contact with the lid central panel 87 of the lid 15a. The insert side panels 167, 169, 171 fit inside and are generally in face-to-face contact with the lid reinforcement flaps 137, 139, 141 of the respective lid side panels 91, 93, 95 of the lid 15a. The insert central panel 165 can be adhesively secured to the lid central panel 87 by adhesive (e.g., glue), or the insert 15b can be secured to the lid 15a by other suitable attachment mechanisms. Further the lid assembly 15 can be formed by other flap or panel positioning steps and the lid assembly 15 can be otherwise shaped, arranged, and/or configure without departing from the disclosure. For example, the lid assembly 15 could be a one-piece lid with the top portion 15a and the bottom portion 15b being formed from the same blank without departing from the disclosure.

Figure 6:
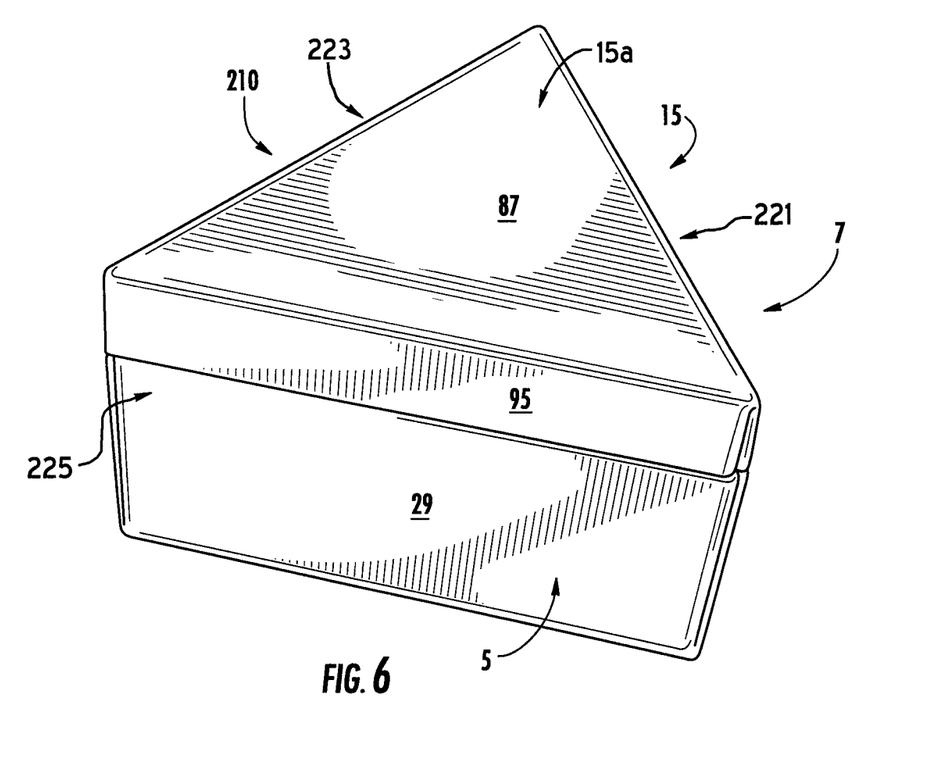
FIG. 6 is a perspective view of an assembled package in a closed configuration according to one embodiment of the disclosure.
Figure 7:
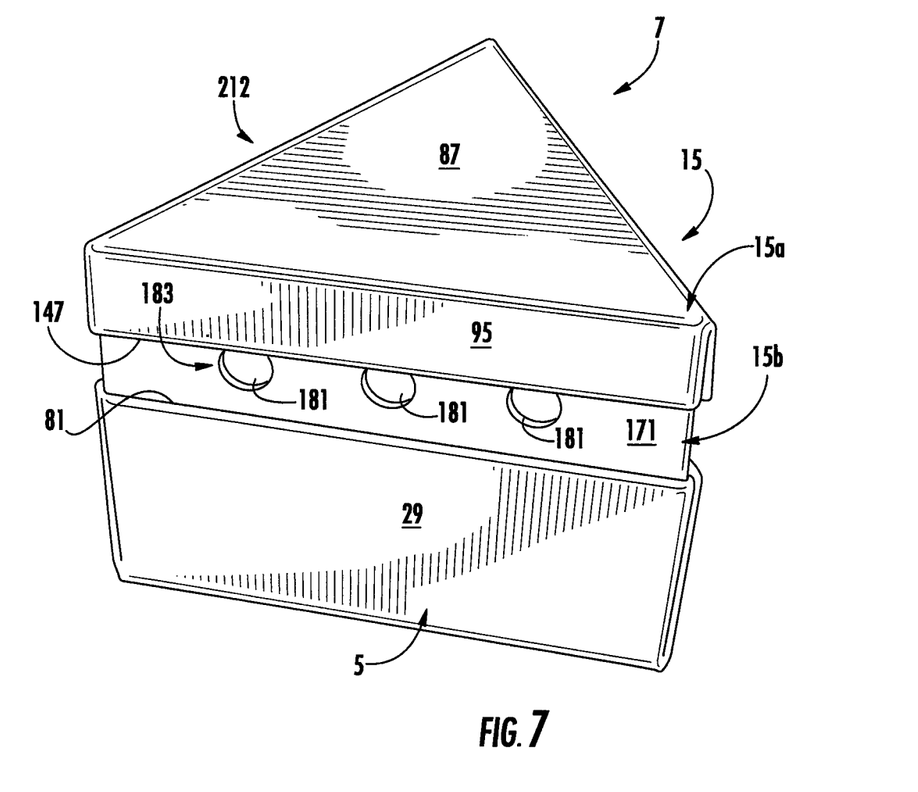
FIG. 7 is a perspective view of the package of FIG. 6 in a venting configuration.

As shown in FIG. 6, the package 7 can be formed by placing a food product (not shown) in the tray 5, and closing the package by placing the lid over the tray to interior space 200 of the tray. The insert side panels 167, 169, 171 of the insert 15b fit inside the tray side panels 19, 25, 29 of the tray 5 so that the bottom edges (at fold lines 143, 145, 147) of the lid side panels 91, 93, 95 of the lid 15a abut a respective top edge (at fold lines 77, 79, 81) of the tray side panels 19, 25, 29 of the tray 5 so that the package 7 is configured in a closed position 210. As shown in FIG. 7, when cooking or heating the food product, the lid assembly 15 can be raised into a venting position 212 so that the lower portion 15b of the lid assembly is exposed in a manner to allow venting of hot air or steam from inside the package 7 through the openings 181 in the central portions of the insert side panels. In some embodiments, the lid assembly 15 can be raised to the position of FIG. 7 prior to initiating heating or cooking of the food product. In other embodiments, the heating or cooking of the food product can be initiated with the lid assembly in the closed position 210 of FIG. 6 and the formation of heated air or steam inside the package 7 will raise the lid assembly to a partial venting position (not shown) where the venting portions 183 of the insert side panels 167, 169, 171 are at least partially exposed above the top edges of the tray side panels 19, 25, 29 of the tray 5 to allow gases in the package to escape through the openings 181. In some embodiments, further heating or cooking of the food product will further raise the lid assembly 15 to the venting position 212 of FIG. 7.

In the illustrated embodiment, the tray central panel 17, the lid central panel 87, and the insert central panel 165 are substantially equilateral triangles, wherein the tray central panel 17 and the lid central panel 87 are substantially the same size, wherein the height H2 of the lid central panel 87 is substantially the same as the height H3 of the tray central panel 17. Accordingly, the lid side panels 91, 93, 95 are generally aligned with one of the tray side panels 19, 25, 29 when the lid assembly 15 engages the tray 5 in either the closed position 210 or the venting position 212. For example, in the illustrated embodiment, the tray side panel 19 and the lid side panel 91 are aligned and cooperate to form a side wall 221 of the package 7, the tray side panel 25 and the lid side panel 93 are aligned and cooperate to form a side wall 223 of the package 7, and the tray side panel 29 and the lid side panel 95 are aligned and cooperate to form a side wall 225 of the package 7. Since the central panels are equilateral triangles, the lid assembly 15 can be oriented with respect to the tray 5 so that the lid side panels 91, 93, 95 are generally aligned with any one of the tray side panels 19, 25, 29. In an alternative embodiment, the lid central panel 87 can be a different size than the tray central panel 17. In a further alternative, the central panels can be non-equilateral triangles, such as isosceles or scalene triangles, or the central panels can be any other shape.

Any of the various embodiments of the present disclosure could include at least one microwave energy interactive element that may comprise a susceptor for becoming hot when exposed to microwave energy, although other types and various combinations of microwave energy interactive elements are also within the scope of the present disclosure, as will be discussed below. Also, the various embodiments of the present disclosure could be free of a microwave energy interactive element without departing from the disclosure.

A blank according to the present disclosure can be, for example, formed from coated paperboard and similar materials. For example, the interior and/or exterior sides of the blank can be coated with a clay coating. The clay coating may then be printed over with product, advertising, price coding, and other information or images. The blank may then be coated with a varnish to protect any information printed on the blank. The blank may also be coated with, for example, a moisture barrier layer, on either or both sides of the blank. In accordance with the above-described embodiments, the blank may be constructed of paperboard of a caliper such that it is heavier and more rigid than ordinary paper. The blank can also be constructed of other materials, such as cardboard, hard paper, or any other material having properties suitable for enabling the package to function at least generally as described herein. The blank can also be laminated or coated with one or more sheet-like materials at selected panels or panel sections.

In accordance with the above-described embodiments of the present disclosure, a fold line can be any substantially linear, although not necessarily straight, form of weakening that facilitates folding therealong. More specifically, but not for the purpose of narrowing the scope of the present disclosure, fold lines may include: a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; and various combinations of these features.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

The above embodiments may be described as having one or more panels adhered together by glue during erection of the package embodiments. The term "glue" is intended to encompass all manner of adhesives commonly used to secure package panels in place.

The foregoing description illustrates and describes various embodiments of the present disclosure. As various changes could be made in the above construction, it is intended that all matter contained in the above description or shown in the accompanying drawings shall be interpreted as illustrative and not in a limiting sense. Furthermore, the present disclosure covers various modifications, combinations, and alterations, etc., of the above-described embodiments that are within the scope of the claims. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A package for holding a food product, the package comprising:
    a tray comprising a plurality of tray panels that extend at least partially around an interior of the tray, the plurality of tray panels comprising a tray central panel and at least one tray side panel foldably connected to the tray central panel, the at least one tray side panel having a top edge;
    a lid comprising a plurality of lid panels that extend at least partially around an interior of the lid, the plurality of lid panels comprising a lid central panel and at least one lid side panel foldably connected to the lid central panel, the at least one lid side panel having a bottom edge, the lid is moveable relative to the tray between a closed position and a venting position, the lid cooperating with the tray to at least partially close the package when the package is configured in the closed position;
    an insert comprising a plurality of insert panels that extend at least partially around an interior of the insert, the plurality of insert panels comprising at least one insert side panel; and
    venting features comprising at least one opening defined in the at least one insert side panel and operable to vent the package when the package is configured in the venting position; and
    wherein the bottom edge of the at least one lid side panel is adjacent the top edge of the at least one tray side panel and the at least one opening is adjacent an inner surface of the at least one tray side panel when the package is configured in the closed position, and when the package is configured in the venting position, the bottom edge of the at least one lid side panel is spaced apart from the top edge of the at least one tray side panel and a venting portion of the at least one insert side panel is exposed between the lid and the tray.

2. The package of claim 1, wherein at least a portion of the at least one insert side panel is disposed in the interior of the tray adjacent at least a portion of the at least one tray side panel, and at least a portion of the at least one insert side panel is disposed in the interior of the lid adjacent at least a portion of the at least one lid side panel.

3. The package of claim 2, wherein the plurality of insert panels comprises an insert central panel foldably connected to the at least one insert side panel and at least partially in face-to-face contact with the lid central panel.

4. The package of claim 3, wherein the at least one tray side panel comprises a plurality of tray side panels, the at least one lid side panel comprises a plurality of lid side panels, and the at least one insert side panel comprises a plurality of insert side panels, wherein the tray central panel is substantially the same size as the lid central panel so that an upper edge of each of the tray side panels abuts a lower edge of a respective one of the lid side panels when the package is configured in the closed position.

5. The package of claim 2, wherein the at least one opening being disposed in the venting portion of the at least one insert side panel.

6. The package of claim 5, wherein the at least one tray side panel comprises a first tray side panel, a second tray side panel, and a third tray side panel, the at least one lid side panel comprises a first lid side panel generally aligned with the first tray side panel, a second lid side panel generally aligned with the second tray side panel, and a third lid side panel generally aligned with the third tray side panel, and the at least one insert side panel comprises a first insert side panel at least partially in face-to-face contact with the first tray side panel and the first lid side panel, a second insert side panel at least partially in face-to-face contact with the second tray side panel and the second lid side panel, and a third insert side panel at least partially in face-to-face contact with the third tray side panel and the third lid side panel.

7. The package of claim 6, wherein the at least one opening comprises at least three openings disposed in each venting portion of each of the first, second, and third insert side panels.

8. A package for holding a food product, the package comprising:

a tray comprising a plurality of tray panels that extend at least partially around an interior of the tray, the plurality of tray panels comprising a tray central panel and at least one tray side panel foldably connected to the tray central panel;

a lid comprising a plurality of lid panels that extend at least partially around an interior of the lid, the plurality of lid panels comprising a lid central panel and at least one lid side panel foldably connected to the lid central panel, the lid is moveable relative to the tray between a closed position and a venting position, the lid cooperating with the tray to at least partially close the package when the package is configured in the closed position;

an insert comprising a plurality of insert panels that extend at least partially around an interior of the insert, the plurality of insert panels comprising at least one insert side panel;

venting features operable to vent the package when the package is configured in the venting position;

wherein the venting features are substantially covered in the closed position and the venting features are at least partially uncovered in the venting position; and the at least one tray side panel comprises a first tray side panel foldably connected to a first tray corner panel and a second tray side panel foldably connected to a second tray corner panel, wherein the first tray corner panel is foldably connected to the second tray corner panel, and the first tray corner panel is at least partially in face-to-face contact with the second tray corner panel to at least partially close a first corner of the tray.

9. The package of claim 8, wherein the first tray side panel is foldably connected to a first tray reinforcement flap and the second tray side panel is foldably connected to a second tray reinforcement flap, the first and second tray reinforcement flaps being at least partially in face-to-face contact with the respective first and second tray side panel.

10. The package of claim 9, wherein the first tray corner panel is in face-to-face contact with at least a portion of the first tray side panel and the second tray corner panel is in face-to-face contact with at least a portion of the first tray reinforcement flap.

11. The package of claim 8, wherein the at least one lid side panel comprises a first lid side panel foldably connected to a first lid corner panel and a second lid side panel foldably connected to a second lid corner panel, wherein the first lid corner panel is foldably connected to the second lid corner panel, and the first lid corner panel is at least partially in face-to-face contact with the second lid corner panel to at least partially close a first corner of the lid.

12. The package of claim 11, wherein the first lid side panel is foldably connected to a first lid reinforcement flap and the second lid side panel is foldably connected to a second lid reinforcement flap, the first and second lid reinforcement flaps being at least partially in face-to-face contact with the respective first and second lid side panel.

13. The package of claim 12, wherein the first lid corner panel is in face-to-face contact with at least a portion of the first lid side panel and the second lid corner panel is in face-to-face contact with at least a portion of the first lid reinforcement flap.

14. The package of claim 11, wherein the first and second tray side panels are respectively foldably connected to a third tray corner panel and a fourth tray corner panel, and the at least one tray side panel comprises a third tray side panel foldably connected to a fifth tray corner panel and a sixth tray corner panel, the fifth tray corner panel foldably connected to and at least partially in face-to-face contact with the third tray corner panel to at least partially close a second corner of the tray, and the sixth tray corner panel foldably connected to and at least partially in face-to-face contact with the fourth tray corner panel to at least partially close a third corner of the tray.

15. The package of claim 14, wherein the first and second lid side panels are respectively foldably connected to a third lid corner panel and a fourth lid corner panel, and the at least one lid side panel comprises a third lid side panel foldably connected to a fifth lid corner panel and a sixth lid corner panel, the fifth lid corner panel foldably connected to and at least partially in face-to-face contact with the third lid corner panel to at least partially close a second corner of the lid, and the sixth lid corner panel foldably connected to and at least partially in face-to-face contact with the fourth lid corner panel to at least partially close a third corner of the lid.

16. The package of claim 15, wherein the at least one insert side panel comprises a first insert side panel disposed at least partially in the interior of the tray adjacent the first tray side panel and at least partially in the interior of the lid adjacent the first lid side panel, a second insert side panel disposed at least partially in the interior of the tray adjacent the second tray side panel and at least partially in the interior of the lid adjacent the second lid side panel, and a third insert side panel disposed at least partially in the interior of the tray adjacent the third tray side panel and at least partially in the interior of the lid adjacent the third lid side panel.

* * * * *